United States Patent [19]

Vaughan

[11] Patent Number: 5,198,085
[45] Date of Patent: * Mar. 30, 1993

[54] RESTORATION OF ALKALI HYDROXIDE ETCHANTS OF ALUMINUM

[76] Inventor: Daniel J. Vaughan, 36 Paxon Dr., Wilmington, Del. 19803

[*] Notice: The portion of the term of this patent subsequent to Aug. 25, 2009 has been disclaimed.

[21] Appl. No.: 508,201

[22] Filed: Apr. 12, 1990

[51] Int. Cl.$^5$ .............................................. B01D 61/00
[52] U.S. Cl. ................................. 204/182.4; 204/96; 204/98; 204/97; 204/151; 204/116; 204/118; 204/121
[58] Field of Search ................. 204/98, 182.4, 96, 116, 204/121, 118, 151, 97

[56] References Cited

U.S. PATENT DOCUMENTS

| | | | |
|---|---|---|---|
| 1,572,115 | 2/1926 | Greenawalt | 204/116 |
| 2,723,229 | 11/1955 | Bodamer | 204/98 |
| 3,477,928 | 11/1969 | Coltrinari | 204/117 |
| 4,107,007 | 8/1978 | Gäumann et al. | 204/116 |
| 4,111,772 | 9/1978 | Horn | 204/182.4 |
| 4,488,950 | 12/1984 | Pooley et al. | 204/116 |
| 4,519,881 | 5/1985 | Chang | 204/149 |
| 4,636,288 | 1/1987 | Vaughan | 204/182.4 |
| 4,891,067 | 1/1990 | Rappas et al. | 204/116 |

FOREIGN PATENT DOCUMENTS 0015900 1/1984 Japan .
191501 9/1967 U.S.S.R. .

Primary Examiner—John Niebling
Assistant Examiner—Arun S. Phasge

[57] ABSTRACT

An alkali hydroxide solution of a metal hydroxide or metallic oxide acidic is separated into a solid metal hydroxide or metallic oxide acidic and a solution of alkali hydroxide by feeding the alkali solution to an electrolyte comprising a soluble anion of an acid and controlling the pH of the electrolyte to insolubilize a metal hydroxide or metallic oxide acidic by electrotransporting alkali cations from the electrolyte through a cation permeable membrane into a catholyte and converting the alkali cations to a solution of alkali hydroxide. Sodium hydroxide etchants of aluminum containing sodium aluminate are continuously converted to aluminum hydroxide and a solution of sodium hydroxide.

21 Claims, No Drawings

RESTORATION OF ALKALI HYDROXIDE ETCHANTS OF ALUMINUM

FIELD OF THE INVENTION

This invention relates broadly to a means for separating multivalent metal hydroxides, metallic oxides acidic and alkali hydroxides. More specifically, this invention relates to an electrochemical means for insolubilizing metal hydroxides or metallic oxides acidic in alkali hydroxide solutions. Specifically, this invention relates to an electrochemical process for insolubilizing aluminum hydroxide in alkali hydroxide etchants of aluminum containing sodium aluminate or dissolved aluminum. The invention comprises feeding an etchant to an electrodialytic cell having an electrolyte comprising a soluble anion of an acid or soluble salt of an acid and electrotransporting sodium ions from the electrolyte at the rate sodium ions are fed to the electrolyte whereby the pH of the electrolyte is controlled to cause sodium aluminate to convert to insoluble aluminum hydroxide and sodium hydroxide. The use of a soluble anion of an acid in the electrolyte makes possible, in electrolysis, control of the pH of the electrolyte, continuous and efficient electrotransport of sodium ions and the continuous insolubilization of metal hydroxides and metallic oxides acidic from alkali hydroxide solutions. The process of this invention is especially useful for separating dissolved aluminum from sodium hydroxide etchants of aluminum and alloys of aluminum so that the sodium hydroxide can be used again and again to etch aluminum.

One embodiment of the process of this invention relates to an electrochemical process comprising an electrochemical cell having an anolyte compartment and a catholyte compartment separated by a cation permeable membrane. The catholyte compartment contains a cathode and a catholyte comprising an aqueous solution of alkali hydroxide. The anolyte compartment contains an anode and an anolyte comprising a soluble anion of an acid or soluble salt of an acid to which is fed a solution comprising an alkali hydroxide and a metal hydroxide or a metallic oxide acidic while passing electricity through the cell to electrotransport alkali cations from the anolyte at the rate alkali cations are fed to the anolyte whereby the pH of the anolyte is controlled to insolubilize the metal hydroxide or metallic oxide acidic in the anolyte and to convert the electrotransported alkali cations to a solution of alkali hydroxide in the catholyte compartment.

BACKGROUND OF THE INVENTION

In many uses of alkali hydroxides, excess of the alkali hydroxide is used, resulting in the formation of gels, sols, dispersions and solutions. This is especially the case for sodium hydroxide etchants of aluminum and alloys of aluminum. Aluminum is usually etched in a 15 wt. % to 30 wt. % solution of sodium hydroxide at temperatures above 50° C. until about 20 or more grams of aluminum are etched per liter of etchant. The aluminum appears to be dissolved and seeding and cooling results in a very limited removal of sodium aluminate or aluminum hydroxide by filtration of the etchant. Since the etching rate decreases as the aluminum is etched into the sodium hydroxide solution, it is necessary to replace the etchant at relatively low concentrations of aluminum. The alloys of aluminum contain copper, silicon and other metals that are etched into the sodium hydroxide etchant and form a smut or slime or solution. To facilitate the etching process, additives of sulfur, amines and wetting agents are used in the sodium hydroxide etchant. It would be desirable that the etchant be continuously restored to maintain a desired milling rate and quality of the milled alloys. It is an objective of the instant invention to provide a continuous process for purification and restoration of alkali hydroxide etchants for aluminum and aluminum alloys.

It is possible to remove dissolved aluminum hydroxide from sodium hydroxide etchants by cooling and seeding the etchant. (See U.S. Pat. Nos. 4,136,026 and 4,372,805.) This process is, however, difficult to carry out, limited in the percentage of dissolved aluminum (sodium aluminate) that can be removed from the etchant, does not remove soluble impurities, requires hours for effecting separation and requires a relatively large investment in crystallization, filtration and evaporation equipment.

It is, also, known that the alkali hydroxide etchants can be neutralized or acidified with an acid, such as, sulfuric acid, and the aluminum hydroxide separated by filtration. The resulting salt solution can be disposed of as waste or electrodialytically converted to an acid and alkali hydroxide as disclosed in my U.S. Pat. No. 4,636,288. This two-step process requires that the salt solution filtrate be acidic in electrodialysis which increases the electrical cost for removing alkali cations and requires the use of a three compartment cell to prevent fouling of the cation membranes with magnesium, calcium and other multivalent metal cations in the etchant and salt solution. It would be preferable that the alkali hydroxide etchant be restored in a continuous one-step electrodialytic process where the unwanted aluminum hydroxide and other multivalent metal hydroxides are insolubilized in the pH range of 13 to 7 and removed as solids from an electrolyte and the alkali hydroxide be returned to the etcher as a solution of substantially pure alkali hydroxide. It is an object of this invention to provide a one-step continuous process for reforming alkali hydroxide etchants of aluminum and alloys of aluminum.

Electrodialysis is a well-known art (see U.S. Pat. Nos. 4,325,792; 4,439,293 and 4,626,288, the disclosures of which are incorporated by reference). Electrodialysis is the transport of ions through ion permeable membranes as a result of an electrical driving force. The process is commonly carried out in an electrochemical cell having a catholyte compartment containing a cathode and a catholyte and an anolyte compartment containing an anode and an anolyte, the catholyte and anolyte compartments being separated by ion permeable membranes. The electrotransport of sodium and other alkali metal cations through cation permeable membranes is a known art. However, prior art does not provide a means for insolubilizing in an electrolyte of an electrodialytic process aluminum and other metal hydroxides and metallic oxides acidic in an alkali hydroxide solution, gel, sol or colloidal dispersion feed to the electrodialytic process.

Many of the hydroxides of heavy metals, such as aluminum, lead, tin, zinc, gallium and tungsten are soluble or appear to be soluble in excess of sodium or potassium hydroxide. This has been attributed to the formation of salts, the hydroxides behaving as amphoteric substances and giving either $OH^-$ or $H^+$ ions according to the condition of the experiment. For example, when aluminum hydroxide is dissolved in sodium hydroxide, sodium aluminate is supposed to be formed. It is possible, however, that the solution of the aluminum is not so much a matter of compound formation as of peptization of the hydroxide to form a sol, gel or colloidal dispersion. It is, of course, difficult to mechanically separate the multivalent metal hydroxide from an alkali hydroxide gel, sol, solution or colloidal dispersion.

When a metal has several oxides, the basic properties of the hydroxides become less pronounced as the valency of the metal increases. When a certain limit of valency is reached, the basic properties disappear almost completely and salt formation does not take place to an appreciable extent. The acidic oxides are formed only by those metals which can exert a high valency and thus combine with several oxygen atoms. The acidic tendency is almost invariably in the quinquevalent and higher valence of the metal. Hence metals, in the right-hand half of the periodic table give acidic oxides that form salts with alkali metal cations. These metallic oxides acidic, such as molybdic, tungstic, uranic, vanadic, niobic and tantalic, cannot always be isolated in pure form by neutralization of the salts as they are frequently converted to anhydrides or polymerized or dissolved in excess of the neutralizing acid. These acids are made from a lower oxide of the metal by heating the oxide with alkali, usually in the presence of an oxidizing agent. The excess alkali is removed by neutralization with an acid to form a soluble alkali salt.

SUMMARY OF THE INVENTION

This invention provides an electrodialytic process for insolubilization and separation of a metal hydroxide, such as aluminum hydroxide or a metallic oxide acidic, such as tungstic acid from an alkali hydroxide solution. The insolubilization of the metal hydroxide or metallic oxide acidic is effected by feeding an alkali hydroxide solution comprising the metal hydroxide or metallic oxide acidic to an electrolyte in an electrodialytic process comprising a soluble anion of an acid or a soluble salt of an acid while passing electricity through the cell to remove alkali cations from the electrolyte at the rate alkali cations are fed to the electrolyte to effect and maintain the pH of the electrolyte whereby the metal hydroxide or metallic oxide acidic is insolubilized and separated from the electrolyte and the electrotransported alkali cations are converted to a solution of alkali hydroxide in the catholyte of the electrodialytic process. The process of this invention is especially useful for removing dissolved aluminum or sodium aluminate from sodium hydroxide etchants of aluminum.

DETAILED DESCRIPTION OF THE INVENTION

Many metal hydroxides and metallic oxides acidic appear to be soluble in solutions of alkali hydroxide. Aluminum hydroxide can be dissolved in sodium hydroxide to form a clear solution. These apparent solutions could be described as sols, gels, colloidal dispersions or solutions of salts of multivalent metal hydroxides and metallic oxides acidic and alkali hydroxides. Aluminum hydroxide is substantially insoluble in water whereas alkali hydroxides are very soluble in water. It would be expected that dilution of a sol, gel or solution of the insoluble metal hydroxide and the soluble alkali hydroxide that the metal hydroxide would be insolubilized in the alkali hydroxide and become a solid in a dilute alkali hydroxide solution. This usually does occur but the time for separation of the metal hydroxide could be several hours, days or weeks. I thought that removal of some or most of the alkali hydroxide from the solution using electrodialysis would facilitate a faster separation of the aluminum hydroxide as a solid in the depleted solution. The alkali hydroxide was removed from the solution as alkali cations using electrodialysis. In general, there was little change in the separation time of the alkali hydroxide depleted solution and the initial alkali hydroxide feed solution. The electrodialysis was carried out by feeding the concentrated alkali hydroxide solution to the anolyte compartment of an electrolysis cell separated by a cation permeable membrane from the catholyte compartment. Alkali cations were electrotransported from the anolyte to the catholyte and converted to sodium hydroxide. The alkali hydroxide depleted anolyte was seeded with aluminum hydroxide, cooled and the separation time noted. In another experiment, a batch of the concentrated alkali hydroxide solution of aluminum hydroxide was added to the anolyte compartment and the electrodialysis carried out to deplete the solution of alkali hydroxide. The electrodialysis process operated at a low voltage-high current in the initial period and a high voltage and a low and controlled current after part of the alkali cations had been removed. After an extended period at high voltage-low current, the conductivity of the anolyte was too low for electrodialysis. It appears that the initial solution consisted of free sodium cations and combined sodium cations and that the low voltage-high current period represented electrotransport of free sodium cations and the high voltage-low current period represented the dissociation of sodium aluminate into free sodium cations that could be electrotransported, and finally aluminum hydroxide was formed which is not soluble or electrically conductive. This batch method for removing sodium cations does effect, in time, separation of the alkali hydroxide from the aluminum hydroxide; however, it does not provide an efficient, rapid or continuous process for the separation.

I have now found that the use of a soluble anion of an acid or soluble salt of an acid in the anolyte or feed compartment of an electrodialytic cell to which the alkali hydroxide solution comprising a metal hydroxide or metallic oxide acidic is fed provides a means for rapidly and continuously separating alkali hydroxide solutions comprising a metal hydroxide or metallic oxide acidic into a solid metal hydroxide or metallic oxide acidic and a solution of substantially pure alkali hydroxide. The soluble anion of an acid or soluble salt of an acid provides a means for varying and controlling the pH of the anolyte or feed electrolyte over the pH range from just less than a pH of 14 to the pH of a solution of the acid of the soluble anion added to the electrolyte.

The pH of the anolyte or feed electrolyte is varied and controlled by alkali cations fed to the electrolyte and by alkali cations electrotransported from the electrolyte. When the number of alkali cations fed to the electrolyte exceeds the number of alkali cations electrotransported, the pH of the electrolyte will increase and when the number of alkali cations electrotransported exceeds the number fed to the electrolyte, the pH of the electrolyte will decrease. For continuous operation at a controlled pH, the number of alkali cations fed to the electrolyte must equal the number of alkali cations removed. For example, the feed rate of the alkali hydroxide solutions can be controlled by pH of the electrolyte or the feed rate can be fixed and the electrotransport rate varied to maintain pH.

In electrodialysis, cations are attracted to the negatively charged cathode and anions are attracted to the positively charged anode. Water is oxidized to produce hydrogen ions at the cell anode and reduced at the cell cathode to produce hydroxyl ions. When a sodium ion is electrotransported from the anolyte, it is replaced by a hydrogen ion or a sodium ion entering with the feed. Cation permeable membranes are permeable to cations and substantially impermeable to anions.

When an alkali hydroxide solution is fed to an electrolyte that does not contain an anion of an acid, the pH of the electrolyte must be greater than seven to be electrically conductive. At a pH greater than seven the electrical conductivity of the electrolyte is dependent on the concentration of alkali hydroxide. The addition of a soluble anion of an acid to the electrolyte provides a means to have a very conductive electrolyte at any pH or alkali hydroxide concentration, especially in the pH range of seven to less than 14 where the concentration of alkali hydroxide is low in the electrolyte.

It will be apparent to one skilled in the art that the concentration of the soluble anion of the acid can be varied over a wide range and that any anion can be used that provides the desired pH in the anolyte or feed electrolyte of the electrodialytic process. The preferred soluble anions are anions of acids of sulfur, halogen, nitrogen, phosphorus and carbon which acids in a 0.1 normal solution would have a pH of less than three and more preferably of two or less. Mixtures of soluble anions can be used.

It is preferable to carry out the insolubilization of aluminum hydroxide and other metal hydroxides in an alkali hydroxide etchant at a pH of seven or higher to minimize the potential of fouling the ionic transport of the membrane with precipitates of multivalent metal cations. The electrical efficiency for electrotransport of alkali cations also decreases at a pH less than seven. However, the insolubilization of the aluminum hydroxide is more rapid at a pH less than seven. When the alkali etchant contains polysulfides, the insolubilization can be carried out at a pH of about 10 without a noticeable formation of hydrogen sulfide or the insolubilization can be carried out at a lower pH to produce hydrogen sulfide which is adsorbed in alkali hydroxide and returned to the etchant. When the etchant contains triethanol amine, it is usually preferable to carry out the insolubilization at a pH of about 8 and the triethanol amine adsorbed from the electrolyte on an acidic polymeric adsorbant and desorbed by alkali hydroxide for return to the etchant. It will be apparent to one skilled in the art that the process of this invention can be carried out continuously with control of pH and that the pH of the anolyte or feed electrolyte can be varied as desired to effect insolubilization of aluminum hydroxide.

In contrast to alkali cations, multivalent metal cations form substantially water insoluble hydroxides and salts with some anions of acids and tend to be ionically immobile in alkali hydroxide solutions. The pH at which a multivalent metal hydroxide is converted to an ionically mobile multivalent cation in sufficient concentration to foul cation permeable membranes is different for each multivalent metal hydroxide. It appears that the pH at which a multivalent metal cation begins to form a hydroxide in a 0.03 molar solution of a salt of the multivalent metal cation is a good approximation. The acid anion associated with the multivalent metal cations will affect solubility of the multivalent metal cation and the pH at which hydroxide formation begins. The approximate pH at which hydroxides begin to be precipitated from a 0.03 molar solution of salts is: Mg 10.5, Mn$^{++}$8.8, Nd 7.0, Zn$^{++}$7.1, Co$^{++}$6.8, Ni$^{++}$6.7, Pb$^{++}$6.7, Fe$^{++}$5.7, Cu$^{++}$5.5, Cr$^{+++}$5.3, Al$^{+++}$4.1, Sn$^{++}$2.0, Fe$^{+++}$2, Ti$^{++++}$2. When the pH in an electrolyte solution is equal or lower than the pH where hydroxides precipitate from salts, a multivalent metal cation of the salt becomes ionically mobile and, if conditions permits, will foul or be electrotransported through a cation permeable membrane.

To prevent solubilization of a multivalent metal hydroxide in the feed electrolyte, it is desirable to keep the pH of the feed electrolyte above the pH at which a multivalent metal cation in the feed electrolyte becomes ionically mobile. For example, if the feed contained only aluminum hydroxide, the pH of the electrolyte should be greater than 5.0 to prevent solubilization of aluminum hydroxide. If the feed contained zinc, cobalt, nickel, lead, copper, iron, aluminum and titanium hydroxides, the pH of the feed electrolyte should be greater than seven to prevent solubilization of multivalent metal hydroxides the cations of which could foul the ionic transport of the cation permeable membrane. At times it is advantageous to add agents to the electrolyte, such as, sodium oxalate, to insolubilize metal cations that become ionically mobile. Agents that complex or insolubilize metal cations provide for operation at a lower pH to facilitate the rate the major multivalent metal hydroxides are insolubilized in the electrolyte.

Any soluble anion of an acid can be used in the electrodialytic processes of this invention to electrodialytically vary and maintain pH of an electrolyte and to increase the electrical conductivity of an electrolyte comprising a very dilute solution of alkali hydroxide. Any soluble anion of an acid or salt can be used. Preferably the anion is an anion of an acid which acid in a one normal solution would have a pH no greater than 3. The preferred acids are acids of sulfur, halogen, nitrogen, phosphorus and carbon which acids in a 0.1 normal solution would have a pH of less than 3. The concentration of the soluble anion or mixture of anions can be varied as will be apparent to one skilled in the art. The concentration of the salt must be sufficient to effect the desired pH and electrical conductivity in the feed electrolyte. The anion can be added as an acid, a soluble salt, or a salt that forms a soluble ionically mobile anion when added to the electrolyte.

The electrochemical cells of this invention can have two or more compartments. A two compartment cell has an anolyte and a catholyte compartment separated by a cation permeable membrane. The anolyte compartment has an anode and an aqueous anolyte comprising a soluble anion of an acid to which is fed an alkali hydroxide solution comprising sodium aluminate (dissolved aluminum hydroxide) or other metal hydroxide or metallic oxide acidic. The catholyte compartment has a cathode and an aqueous catholyte comprising an alkali hydroxide. When electricity is passed through the cell, alkali cations are removed from the anolyte at the rate alkali cations are fed to the anolyte to maintain a pH of the anolyte to effect insolubilization of a multivalent metal hydroxide or metallic oxide acidic in the anolyte compartment and the alkali cations electrotransported from the anolyte are converted to an alkali hydroxide in the catholyte. The alkali cations are replaced in the anolyte by hydrogen ions formed at the cell anode or by alkali cations entering the anolyte with the feed. In general, the two compartment cell is operated with an anolyte having a pH no less than 5 or the pH at which a multivalent metal cation becomes ionically mobile and fouls the ion transport of the membrane.

The process of this invention can be carried out in an electrochemical cell having three or more compartments separated by cation permeable membranes. A three compartment cell has an anolyte compartment, a feed or reactor compartment and a catholyte compartment. The anolyte compartment has an anode and an aqueous anolyte, the feed-reactor compartment has an aqueous electrolyte and the catholyte compartment has a cathode and aqueous catholyte of alkali hydroxide. The alkali hydroxide feed solution can be fed to the anolyte compartment or the feed-reactor compartment. In general, the three compartment cell is used when the feed solutions contain materials sensitive to anodic oxidation (solution fed to feed-reactor compartment) and when it is preferable or necessary to insolubilize multivalent hydroxides in the feed at a pH less than the pH at which an ionically mobile cation would foul a cation membrane, and the alkali hydroxide feed is added to the anolyte compartment. The feed-reactor electrolyte would contain a soluble anion of an acid and agents that insolubilize or ionically immobilize multivalent metal cations (See U.S. Pat. No. 4,636,288). Cells of this invention that have more than three compartments can be separated by all cation permeable membranes or combinations of cation, anion, bipolar membranes and porous separators provided that the membrane between the feed cell compartment comprising the soluble anion of an acid is separated from the catholyte compartment by a cation permeable membrane.

The alkali hydroxide solution that is fed to the anolyte or feed electrolyte of this invention can comprise any metal hydroxide or metallic oxide acidic that forms a sol, gel, colloidal dispersion or solution with the alkali hydroxide and can be insolubilized in the anolyte or feed electrolyte. The alkali hydroxide solutions can comprise two or more metal hydroxides or metallic oxides acidic or mixtures of metal hydroxides or metallic oxides acidic.

Any cation permeable membrane can be used to separate the compartments of the electrodialytic cells of this invention. The cation permeable membranes have fixed negative charges distributed in a polymer matrix and are permeable to positively charged ions. The membranes are preferably membranes of hydrocarbon and halocarbon polymers containing acid and acid derivatives. Particularly suitable acid polymers are perhalocarbon polymers containing pendant sulfonic acid, sulfonamide and carboxylic acid groups. The membranes may be a multi-layered structure of different polymers and contain fillers, reinforcements and chemical modifiers. The preferred membranes are substantially chemically stable to the process conditions and mechanically suitable for design and economical operation of the electrodialytic process. The preferred membranes have high electrical conductivity and high electrotransport of alkali metal cations. The most preferred membranes are perfluorocarbon membranes, such as NAFION, manufactured by E. I. duPont Company, that contain sulfonic, carboxylic or sulfonamide groups. Preferably the membrane separating the catholyte compartment from other cell compartments has a high electrotransport of alkali metal cations and is suitable for making various concentrations of alkali hydroxide solutions. A membrane with high water transport is preferable for dilute alkali hydroxide solutions and a membrane with low water transport is preferable for making concentrated alkali hydroxide solutions.

The alkali hydroxide of this invention can be a hydroxide of the alkali metals or ammonium. Preferably the alkali hydroxide is sodium or potassium hydroxide. The alkali hydroxide solution comprising dissolved aluminum and other metal hydroxides or metallic oxides acidic can contain carbonates, bicarbonates and other chemicals normally used to etch aluminum. Mixtures of alkali hydroxides can be used.

The alkali hydroxide etchant of aluminum containing sodium aluminate or dissolved aluminum can have oxides and hydroxides of other metals including those in the alloys of aluminum. The solution can also have sulfides, amines and other chemicals used in the etching process.

The metal hydroxides of this invention can be any multivalent metal hydroxide that forms a solution, sol, gel or colloidal dispersion in a solution of alkali hydroxide and is substantially insoluble in water. The metallic oxides acidic of this invention can be acidic oxides or salts of tungsten, uranium, molybdenum, niobium, vanadium, tantalum and other acidic metal oxides that are soluble in solutions of alkali hydroxide and insoluble in water.

One embodiment of the process of this invention is the insolubilization of aluminum hydroxide in sodium hydroxide etchants of aluminum containing sodium aluminate or dissolved aluminum. To illustrate the practice of this aspect of the invention, an electrodialytic cell was assembled having an anolyte compartment containing an anode and an aqueous anolyte and a catholyte compartment containing a cathode and catholyte. The compartments were separated by a cation permeable membrane. The cell had an electrolysis of 58 sq. cm. (9 sq. in.) and was equipped for continuously adding feed to the anolyte and filtering solids from the anolyte and returning the filtrate (Filtered anolyte) to the anolyte compartment. The catholyte compartment was equipped to continuously remove catholyte of controlled concentration and to add water to the catholyte. The anode was made of a titanium mesh with a ruthenium oxide coating obtained from the Electrode Corporation. The cation permeable membrane was NAFION perfluorosulfonic acid membrane 324 obtained from the Dupont Company. The cathode was a copper mesh coated with nickel. The total anode to cathode gap was 1 cm. (0.39 in.), the cell temperature 80° to 85° C., the current density 0.3 ampere per sq. cm. (2 amp/in$^2$). Cell voltage was the total anode to cathode voltage. The power supply was custom made to operate at constant current and variable voltage. The volume of the anolyte compartment was 3000 ml. and the catholyte compartment was 500 ml. at overflow to storage. The system was instrumented to measure pH of the anolyte and adjust feed rate to maintain a specified pH and to measure specific gravity of the catholyte.

EXAMPLE 1

The anolyte compartment was filled with a 15 wt. % solution of sodium sulfate and the catholyte compartment with a 10 wt. % solution of sodium hydroxide. Electricity was passed through the cell and a sodium hydroxide etchant containing 21 wt. % sodium hydroxide and 38 grams per liter of dissolved aluminum was fed to the anolyte and the feed rate adjusted to maintain a pH in the anolyte of 7.0 to 7.5. The catholyte was controlled to a 23 wt. % solution of sodium hydroxide. Aluminum hydroxide was continuously insolubilized in the anolyte, filtered from the anolyte, dried and weighed. The cell voltage remained at 3.9 to 4.0 volts throughout the one hour operation. Essentially 100% of the sodium ions in the etchant feed was recovered as sodium hydroxide in the catholyte. About 99% of the aluminum dissolved in the etchant was recovered as aluminum hydroxide. The volume of the anolyte remained essentially constant. After about one hour, the feed rate of the etchant was reduced to increase the pH of the anolyte to 8.0 to 8.5 and the operation continued. The cell voltage was 3.8 to 3.9. Aluminum hydroxide was continuously insolubilized in the anolyte and sodium hydroxide made in the catholyte. Essentially 100% of the sodium ions in the etchant was recovered as sodium hydroxide in the catholyte and over 99% of the dissolved aluminum was recovered from the anolyte. The volume of the anolyte remained essentially constant. After about one hour, the addition rate of etchant feed was adjusted, slightly increased, to reach and maintain a pH of 9.5 to 10 in the anolyte. The cell voltage was 3.8 to 3.9. Aluminum hydroxide was continuously insolubilized in the anolyte, filtered from the anolyte, dried and weighed. Essentially 98% of the sodium ions fed were recovered as sodium hydroxide in the catholyte and about 96% of the dissolved aluminum was recovered as aluminum hydroxide. The volume of the anolyte increased about 0.5%. After about one hour of continuous operation, the electrodialysis was terminated for about five (5) minutes and the anolyte filtered to remove solids. The pH of the anolyte increased to 13 and there was some aluminum hydroxide that separated from the anolyte indicating that the feed rate probably exceeded the insolubilization rate of the dissolved aluminum at a pH of 9 to 10. The electrodialysis was started again and the feed rate adjusted to obtain a pH of 11 to 12 in the anolyte. Aluminum hydroxide was continuously insolubilized (precipitated) in the anolyte and sodium hydroxide made in the anolyte and sodium hydroxide made in the catholyte. The cell voltage was 3.7 to 3.8 and remained essentially constant for the hour operation. About 92% of the sodium ions fed with the etchant (calculated as sodium ions in the unused etchant) was recovered as sodium hydroxide and about 90% of the aluminum was recovered as aluminum hydroxide. The feed was terminated and the pH of the anolyte reduced to about 7.5. Additional aluminum hydroxide was formed in the anolyte and sodium hydroxide made in the catholyte indicating that the concentration of dissolved aluminum was increasing in the anolyte. The cell amperage was reduced to 0.15 ampere per square centimeter ($\frac{1}{4}$ of previous amperage) and the electrolysis continued with the lower feed rate at an anolyte pH of 11 to 12. Aluminum hydroxide was continuously formed in the anolyte and sodium hydroxide in the catholyte. Essentially all of the sodium ions were recovered as sodium hydroxide in the catholyte and about 98% of the dissolved aluminum as aluminum hydroxide. This series of experiments show that aluminum dissolved in an alkali hydroxide etchant can be continuously insolubilized in an electrolyte of an electrodialytic process containing a soluble anion of an acid and controlling the pH of the electrolyte by electrotransport of sodium cations. Essentially all of the sodium ions in the etchant feed was recovered as a solution of substantially pure sodium hydroxide and essentially all of the dissolved aluminum as aluminum hydroxide. The electrodialytic means for restoring sodium hydroxide etchants of aluminum and alloys of aluminum provides a rapid, continuous insolubilization process with recycle of pure sodium hydroxide for etching.

EXAMPLE 2

The cell of Example 1 was used. The anolyte was changed to a 15 wt. % solution of sodium sulfate and 0.5 wt. % sodium oxalate. The catholyte was a 22 wt. % solution of sodium hydroxide. The feed solution was prepared by dissolving 50 g/l of an alloy of aluminum containing 6 wt. % copper and other alloy metals in a 30 wt. % solution of sodium hydroxide containing 2 wt. % triethanol amine and 6.5 wt. % of a Dapco solution containing alkali sulfides. The solution was fed continuously to the anolyte to maintain the pH of the anolyte at 8.5 to 9.5 by electrotransporting sodium ions from the anolyte. Aluminum, copper and other metal hydroxides were continuously removed from the anolyte. There was some odor of hydrogen sulfide in the gas from the anolyte. The feed rate was reduced to maintain the anolyte at a pH of 6.5 to 7.0. More hydrogen sulfide was formed at the lower pH and adsorbed in sodium hydroxide. Essentially all of the sodium ions fed to the anolyte were recovered as sodium hydroxide. Essentially all of the dissolved aluminum and copper fed to the anolyte were recovered as hydroxides.

EXAMPLE 3

One embodiment of the process of this invention is the insolubilization of metallic oxides acidic in alkali hydroxide solutions. To illustrate this aspect of the invention, the electrodialytic cell of Examples 1 and 2 was converted to a three compartment cell by adding a reactor compartment between the anolyte and catholyte compartments. The reactor compartment was separated from the anolyte compartment by a NAFION 417 membrane and catholyte compartment by a NAFION 324 membrane. The anolyte and catholyte compartments were equipped as in Example 1. The reactor compartment contained a 10 wt. % sodium sulfate and 1.0 wt. % sodium oxalate and sodium hydroxide as required to maintain pH at 9.0 to 9.5. A feed solution containing 30 g/l of sodium molybdate and 180 g/l of sodium hydroxide was fed to the anolyte at a rate to maintain the anolyte at a pH of 4. A yellow-white precipitate separated in the anolyte and slowly became a solid that was removed. The reactor compartment solution contained some solids, mostly calcium with traces of iron and copper. The complexity of the molecular structure of molybdates precluded a compound and material balance. The yellow-white solid was about 80 % molybdic acid. Essentially all of the sodium ions fed were recovered in the catholyte as sodium hydroxide.

The anolyte and reactor compartment solutions were replaced with fresh solutions and the pH of the anolyte adjusted to 2 by passing current through the cell and a solution of about 80 g/l sodium tungstate and 200 g/l of sodium hydroxide was fed to the anolyte at a rate to maintain the pH of the anolyte at 2 to 3. The tungstate-hydroxide solution was prepared by fusing sodium tungstate ($Na_2WO_4 \cdot 2H_2O$) from mallinckrodt with sodium hydroxide and diluting with water. A white to yellow solid separated in the anolyte that was mostly tungstic acid. The reactor compartment electrolyte contained a white precipitate and the catholyte was essentially sodium hydroxide. The electrodialysis was carried out without significant changes in voltage or amperage.

The examples show that metallic oxides acidic can be insolubilized in an electrolyte comprising a soluble anion of an acid when the pH of the electrolyte is controlled by electrotransport of alkali cations from the electrolyte.

I claim:

1. A method for insolubilizing a metal hydroxide in a solution of an alkali hydroxide, comprising the steps of feeding alkali hydroxide solution heavy metal hydroxide to an anolyte compartment of an electrodialysis cell containing an electrolyte having a soluble anion of an acid, and applying electrical energy to the cell to electrotransport alkali cations from the said electrolyte to a catholyte compartment of the cell containing an alkali hydroxide catholyte through a cation permeable membrane separating said compartments, at a rate to control the pH of said electrolyte and to cause said heavy metal hydroxide to separate as a solid in said electrolyte, and to produce an alkali hydroxide in the catholyte.

2. The method of claim 1 wherein said soluble anion of an acid is selected from the group consisting of acids of sulfur, halogen, nitrogen, phosphorous, and carbon, which acids in a one normal solution have a pH no greater than three (3).

3. The method of claim 1 wherein the alkali hydroxide is a hydroxide of an alkali metal from the group of alkali metals consisting of sodium and potassium.

4. The method of claim 1 wherein said metal hydroxide is selected from the group of hydroxides consisting of aluminum, lead, tin, zinc, and gallium.

5. The method of claim 1 wherein said soluble anion of an acid is selected from the group consisting of acids of sulfur, halogen, nitrogen, phosphorous, and carbon, which acids in a one normal solution have a pH no greater than one (1).

6. The method of claim 1 wherein the alkali hydroxide is a hydroxide of ammonium from the group consisting of sodium and potassium.

7. A process using an electrodialysis cell for the insolubilization of a metal hydroxide from a solution of an alkali hydroxide by feeding it as a first aqueous solution to an anolyte compartment containing an anolyte having a soluble anion of an acid, passing an electric current through said electrodialysis cell to electrotransport alkali cations from said first aqueous solution in the anolyte compartment of said electrodialysis cell through a cation permeable membrane into a catholyte compartment of said electrodialysis cell which contains a second aqueous solution of a weak alkaline hydroxide at a rate to control the pH of said first aqueous solution to cause said metal hydroxide to separate as a solid in said first aqueous solution, and to produce in said second aqueous solution an alkali hydroxide such solution being in electrical communication with the cathode of said electrodialysis cell.

8. The process of claim 7 wherein said soluble anion of an acid is selected from the group consisting of acids of sulphur, halogen, nitrogen, phosphorous and carbon which acids in a one normal solution would have a pH no greater than three (3).

9. The process of claim 7 wherein said alkali hydroxide is a hydroxide of an alkali metal from the group consisting of sodium and potassium.

10. The process of claim 7 wherein the metal hydroxide is selected from the group consisting of hydroxides of aluminum, lead, tin, zinc, and gallium.

11. A process using an electrodialysis cell for the insolubilization of aluminum hydroxide dissolved in a solution of sodium hydroxide comprising the steps of feeding to a first aqueous anolyte solution contained in the anolyte compartment of the cell, such anolyte having a soluble anion of an acid, passing an electric current through said electrodialysis cell to electrotransport sodium cations from said first aqueous solution through a cation permeable membrane into a catholyte compartment containing a second aqueous solution at a rate to control the pH of said first aqueous solution to cause said dissolved aluminum hydroxide to separate as a solid in said first aqueous solution and to generate sodium hydroxide said second aqueous solution in said second compartment where such solution is in electrical communication with the cathode of said electrodialysis cell.

12. The process of claim 11 wherein said soluble anion of an acid is selected from the group consisting of acids of sulfur, halogen, nitrogen, phosphorous and carbon, the acids of which in a one normal solution have a pH no greater than three (3).

13. The process of claim 12, where the soluble anion is a sulfate anion.

14. The process of claim 13 wherein said second aqueous solution is a solution of an alkali hydroxide in electrical contact with a cathode of said electrodialysis cell.

15. The process of claim 11 wherein the pH of said anolyte is greater than five and less than fourteen.

16. The process of claim 11 wherein said second aqueous solution is a solution of sodium hydroxide in electrical contact with a cathode of said electrodialysis cell.

17. A method for insolubilizing a metallic oxide acidic in a solution of an alkali hydroxide, comprising the steps of feeding said solution to an anolyte compartment of an electrodialysis cell containing an electrolyte having a soluble anion of an acid and applying electrical energy to the cell to electrotransport alkali cations from the said electrolyte to a catholyte compartment of the cell containing an alkali hydroxide catholyte, through a cation permeable membrane separating said compartments, at a rate to control the pH of said electrolyte and to cause said metal hydroxide to separate as a solid in said electrolyte, and to produce an alkali hydroxide in the catholyte.

18. A process using an electrodialysis cell for the insolubilization of a metallic oxide acidic from a solution of an alkali hydroxide by feeding it as a first aqueous solution to an anolyte compartment containing an anolyte having a soluble anion of an acid, passing an electric current through said electrodialysis cell to electrotransport alkali cations from said first aqueous solution in the anolyte compartment of said electrodialysis cell through a cation permeable membrane into a catholyte compartment of said electrodialysis cell which contains a second aqueous solution of a weak alkaline hydroxide, at a rate to control the pH of said first aqueous solution to cause said metal hydroxide to separate as a solid in said first aqueous solution, and to produce in said second aqueous solution an alkali hydroxide such solution being in electrical communication with the cathode of said electrodialysis cell.

19. A method for insolubilizing a metallic oxide acidic in a solution of an alkali hydroxide, comprising the steps of feeding the said solution to an anolyte compartment of an electrodialysis cell containing an electrolyte having a soluble anion of an acid and applying electrical energy to the cell to electrotransport alkali cations from the said electrolyte to a catholyte compartment of the cell containing an alkali hydroxide catholyte, through a cation permeable membrane separating said compartments, at a rate to control the pH of said electrolyte and to cause said metal hydroxide to separate as a solid in said electrolyte, and to produce an alkali hydroxide in the catholyte, wherein said metallic oxide acidic is selected from the group consisting of acidic oxides of tungsten, molybdenum, vanadium, niobium, tantalum and uranium.

20. A process using an electrodialysis cell for the insolubilization of a metal hydroxide from a solution of an alkali hydroxide comprising the steps of: feeding said solution as a first aqueous solution to an anolyte compartment which contains an anolyte having a soluble anion of an acid, passing an electric current through said electrodialysis cell to electrotransport alkali cations from said first aqueous solution in the anolyte compartment of said electrodialysis cell through a cation permeable membrane into a catholyte compartment of said electrodialysis cell which contains a second aqueous solution of a weak alkaline hydroxide at a rate to control the pH of said first aqueous solution and to cause said metal hydroxide to separate as a solid in said first aqueous solution, and to produce in said second aqueous solution an alkali hydroxide, such solution being in contact with the cathode of said electrodialysis cell, and wherein the metal hydroxide is selected from the group consisting of hydroxides of aluminum, lead, tin, zinc, and gallium.

21. A process using an electrodialysis cell for the insolubilization of a metal oxide acidic from a solution of an alkali hydroxide comprising the step of feeding said solution as a first aqueous solution to an anolyte compartment which contains an anolyte having a soluble anion of an acid, passing an electric current through said electrodialysis cell to electrotransport alkali cations from said first aqueous solution in the anolyte compartment of said electrodialysis cell through a cation permeable membrane into a catholyte compartment of said electrodialysis cell which contains a second aqueous solution of a weak alkaline hydroxide at a rate to control the pH of said first aqueous solution to cause said metallic oxide acidic to separate as a solid in said first aqueous solution, and to produce in said second aqueous solution an alkali hydroxide, such solution being in contact with the cathode of said electrodialysis cell, and wherein the metal hydroxide is selected from the group consisting of hydroxides of aluminum, lead, tin, zinc, and gallium.

* * * * *